United States Patent
Kwon et al.

(10) Patent No.: US 9,287,945 B2
(45) Date of Patent: Mar. 15, 2016

(54) METHOD AND APPARATUS FOR SELECTING BEAMFORMEE STATION (STA) IN PROCESS OF PERFORMING SOUNDING PROTOCOL IN MULTI-USER MULTIPLE-INPUT AND MULTIPLE-OUTPUT (MU-MIMO) COMMUNICATION SYSTEM

(71) Applicant: Electronics and Telecommunications Research Institute, Daejeon (KR)

(72) Inventors: Yong Jin Kwon, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/174,298

(22) Filed: Feb. 6, 2014

(65) Prior Publication Data

US 2014/0307817 A1    Oct. 16, 2014

(30) Foreign Application Priority Data

Apr. 15, 2013    (KR) .......................... 10-2013-0040932

(51) Int. Cl.
*H04B 7/06*    (2006.01)
*H04B 7/04*    (2006.01)

(52) U.S. Cl.
CPC ............ *H04B 7/0452* (2013.01); *H04B 7/0617* (2013.01)

(58) Field of Classification Search
CPC .. H04B 7/0452; H04B 7/0417; H04B 7/0456; H04B 7/0617; H04B 7/0619; H04B 7/0626
See application file for complete search history.

(56) References Cited

U.S. PATENT DOCUMENTS

| | | | |
|---|---|---|---|
| 2011/0194644 A1* | 8/2011 | Liu et al. ........................ | 375/295 |
| 2011/0199946 A1 | 8/2011 | Breit et al. | |
| 2012/0177018 A1 | 7/2012 | Abraham et al. | |
| 2014/0080420 A1* | 3/2014 | Yang et al. ................... | 455/63.4 |
| 2014/0301240 A1* | 10/2014 | Park et al. ..................... | 370/253 |

* cited by examiner

*Primary Examiner* — David B. Lugo
(74) *Attorney, Agent, or Firm* — NSIP Law (57) ABSTRACT

Provided is a method and apparatus for selecting a beamformee station (STA) in a multi-user multiple-input and multiple-output (MU-MIMO) communication system, the method including acquiring channel information associated with a beamformee STA among a plurality of beamformee STAs, verifying whether acquiring channel information associated with a subsequent beamformee STA of the beamformee STA is advantageous or disadvantageous, and determining, based on a result of the verifying, whether the channel information associated with the subsequent beamformee STA is acquired.

15 Claims, 5 Drawing Sheets

METHOD AND APPARATUS FOR SELECTING BEAMFORMEE STATION (STA) IN PROCESS OF PERFORMING SOUNDING PROTOCOL IN MULTI-USER MULTIPLE-INPUT AND MULTIPLE-OUTPUT (MU-MIMO) COMMUNICATION SYSTEM

CROSS-REFERENCE TO RELATED APPLICATION

This application claims the priority benefit of Korean Patent Application No. 10-2013-0040932, filed on Apr. 15, 2013, in the Korean Intellectual Property Office, the disclosure of which is incorporated herein by reference.

BACKGROUND

1. Field of the Invention

Embodiments of the following description relate to a method and apparatus for selecting a beamformee station (STA) in a process of performing a sounding protocol in a multi-user multiple-input and multiple-output (MU-MIMO) communication system.

2. Description of the Related Art

Recently, multi-user multiple-input and multiple-output (MU-MIMO) technology for simultaneously transmitting data to a plurality of stations (STAs) using a plurality of antennas has been realized. In a case of performing MU-MIMO transmission, interference between data transmitted to each of the plurality of STAs may cause degradation in a performance of receiving a transmitted signal. In order to prevent such degradation, beamforming technology based on channel information is being utilized. STAs configuring a beamforming operation may be referred to as a beamformer and a beamformee. For example, the beamformer may indicate an STA to perform transmission using the beamforming technology, and the beamformee may indicate an STA to perform reception using the beamforming technology.

Accordingly, research is being conducted in order to increase transmission efficiency based on channel information associated with a beamformee STA.

SUMMARY

According to an aspect of the present invention, there is provided a method of selecting a beamformee station (STA) in a multi-user multiple-input and multiple-output (MU-MIMO) communication system, the method including acquiring channel information associated with a beamformee STA among a plurality of beamformee STAs, verifying whether acquiring channel information associated with a subsequent beamformee STA of the beamformee STA is advantageous or disadvantageous, and determining, based on a result of the verifying, whether the channel information associated with the subsequent beamformee STA is acquired.

The acquiring may include transmitting, to the plurality of beamformee STAs, a null-data packet announcement (NDPA) frame and a null-data packet (NDP) frame, and receiving a very high throughput compressed beamforming (VHT_CB) frame from the beamformee STA among the plurality of beamformee STAs.

The VHT_CB frame may include the channel information associated with the beamformee STA.

The verifying may include verifying whether the acquiring of channel information associated with the subsequent beamformee STA of the beamformee STA is advantageous or disadvantageous, based on whether data to be transmitted during a remaining transmission opportunity (TXOP) time, measured after a beamformer STA performs beamforming, is sufficient.

When the data to be transmitted during the remaining TXOP time measured after the beamformer STA performs the beamforming is sufficient, the verifying may include extracting an advantageous minimum transmission rate based on a transmission rate measured before the channel information associated with the subsequent beamformee STA is acquired, the remaining TXOP time, and an amount of time required for acquiring the channel information associated with the subsequent beamformee STA, and verifying whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

When the data to be transmitted during the remaining TXOP time measured after the beamformer STA performs the beamforming is insufficient, the verifying may include extracting the advantageous minimum transmission rate based on an amount of the data to be transmitted during the remaining TXOP time, the transmission rate measured before the channel information associated with the subsequent beamformee STA is acquired, and the amount of time required for acquiring the channel information associated with the subsequent beamformee STA, and verifying whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

The determining may include acquiring the channel information associated with the subsequent beamformee STA when the acquiring is verified to be advantageous, and not acquiring the channel information associated with the subsequent beamformee STA when the acquiring is verified to be disadvantageous.

When the channel information associated with the subsequent beamformee STA is not acquired, the determining may include transmitting a sounding end frame to the subsequent beamformee STA.

When the channel information associated with the subsequent beamformee STA is acquired, the acquiring, the verifying, and the determining may be performed on the subsequent beamformee STA.

According to another aspect of the present invention, there is also provided an apparatus for selecting a beamformee STA in an MU-MIMO communication system, the apparatus including a channel information acquirer to acquire channel information associated with a beamformee STA among a plurality of beamformee STAs, a verifier to verify whether acquiring channel information associated with a subsequent beamformee STA of the beamformee STA is advantageous or disadvantageous, and a determiner to determine, based on a result of the verifying, whether the channel information associated with the subsequent beamformee STA is acquired.

The channel information acquirer may include a frame transmitter to transmit an NDPA frame and an NDP frame to the plurality of beamformee STAs, and a frame receiver to receive a VHT_CB frame from the beamformee STA among the plurality of beamformee STAs.

The VHT_CB frame may include the channel information associated with the beamformee STA.

The verifier may verify whether the acquiring of channel information associated with the subsequent beamformee STA of the beamformee STA is advantageous or disadvantageous, based on whether data to be transmitted during a remaining TXOP time measured after a beamformer STA performs beamforming is sufficient.

When the data to be transmitted during the remaining TXOP time measured after the beamformer STA performs the beamforming is sufficient, the verifier may extract an advantageous minimum transmission rate based on a transmission rate measured before the channel information associated with the subsequent beamformee STA is acquired, the remaining TXOP time, and a required time for acquiring the channel information associated with the subsequent beamformee STA, and may verify whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

When the data to be transmitted during the remaining TXOP time measured after the beamformer STA performs the beamforming is insufficient, the verifier may extract the advantageous minimum transmission rate based on an amount of the data to be transmitted during the remaining TXOP time, the transmission rate measured before the channel information associated with the subsequent beamformee STA is acquired, and the required time for acquiring the channel information associated with the subsequent beamformee STA, and may verify whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

The determiner may acquire the channel information associated with the subsequent beamformee STA when the acquiring is verified to be advantageous, and not acquire the channel information associated with the subsequent beamformee STA when the acquiring is verified to be disadvantageous.

When the channel information associated with the subsequent beamformee STA is not acquired, the determiner may include a sounding end frame transmitter to transmit a sounding end frame to the subsequent beamformee STA.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
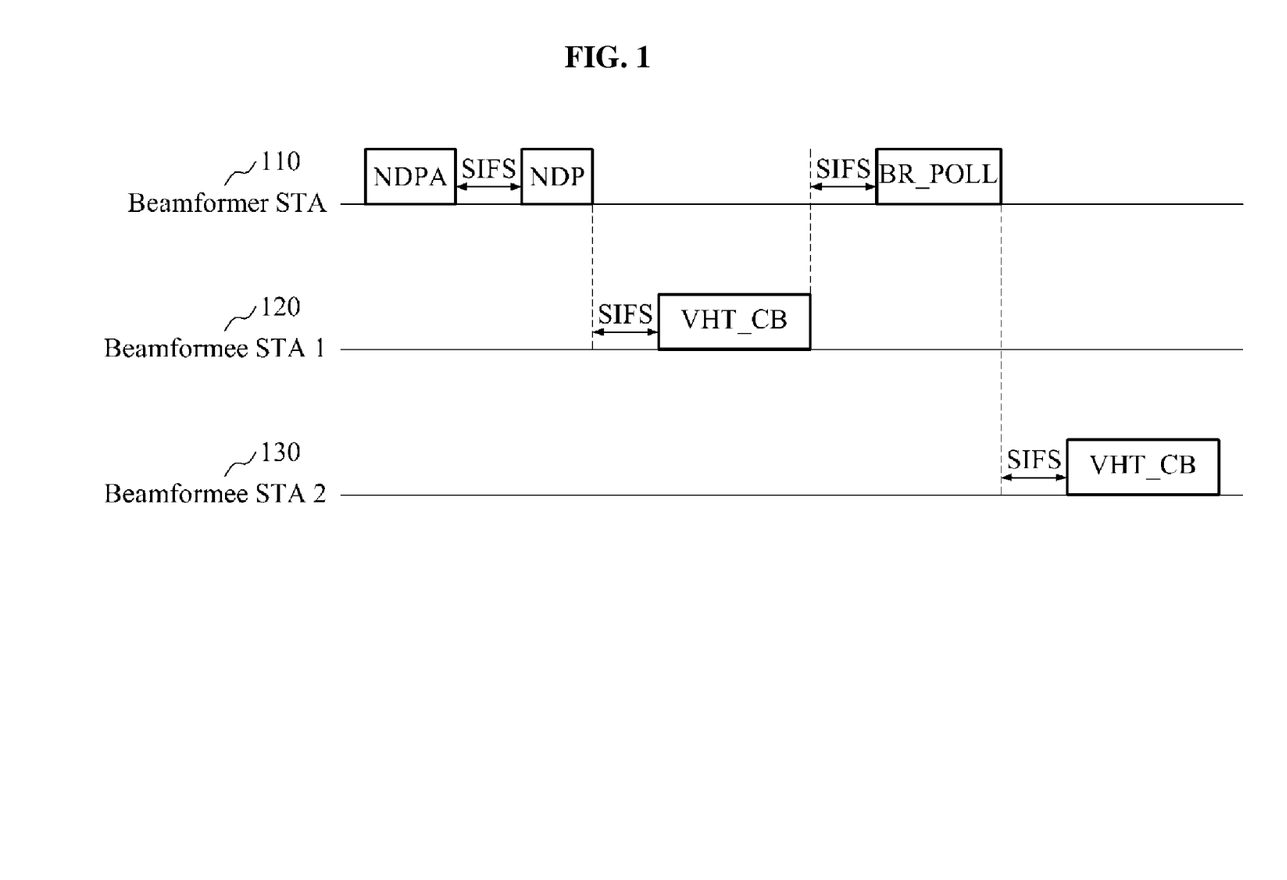
FIG. 1 is a diagram illustrating a sounding protocol according to an example embodiment.

FIG. 1 is a diagram illustrating a sounding protocol according to an example embodiment.

Referring to FIG. 1, the sounding protocol may refer to a protocol for acquiring channel information for performing transmission beamforming. For example, when the sounding protocol is performed, a beamformer station (STA) 110 may transmit a null-data packet announcement (NDPA) frame announcing an initiation of the sound protocol, and transmit a null-data packet (NDP) frame to a short interframe space (SIFS) interval. A beamformee STA 1 120 initially transmitting the channel information may response using a very high throughput compressed beamforming (VHT_CB) frame including the channel information. When other beamformee STAs including a beamformee STA 2 130, aside from the beamformee STA 1 120 receive corresponding beamforming report (BR)_ poll frames, each of the other beamformee STAs may transmit the VHT_CB frame in response to the receiving. Information associated with beamformee STAs on which the sounding protocol is to be performed may be stored in a form of AID in an STA information field of the NDPA Frame. STAs receiving the NDPA frame may verify the STA information field and thus, recognize whether each of the STAs corresponds to a beamformee STA. A number of STA information fields included in a single NDPA frame may be unlimited. Thus, the greater the number of beamformee STAs and channel information items included in the process of the sounding protocol, the greater the degree of an advantage obtained from a process of calculating a beamforming matrix. To acquire channel information associated with a single beamformee STA, a pair of BR_poll frames, a VHT_CB frame responding to the pair of BR_poll frames, and a period of time corresponding to two SIFS intervals may be used. In a structure of the VHT_CB frame, a size of a VHT_CB report field including the channel information may be increased based on a number of transmission streams and a size of a bandwidth and thus, time resources used for transmission may also be increased. When an increased number of beamformee STAs is incorporated in the sounding protocol, a trade-off between an advantage obtained through a beamforming transmission and time resource consumption occurring in a process of the sounding protocol may result. Accordingly, in the sounding protocol, when an excessive number of beamformee STAs are selected, the time resource consumption may be greater than the advantage obtained through the beamforming transmission.

Figure 2:
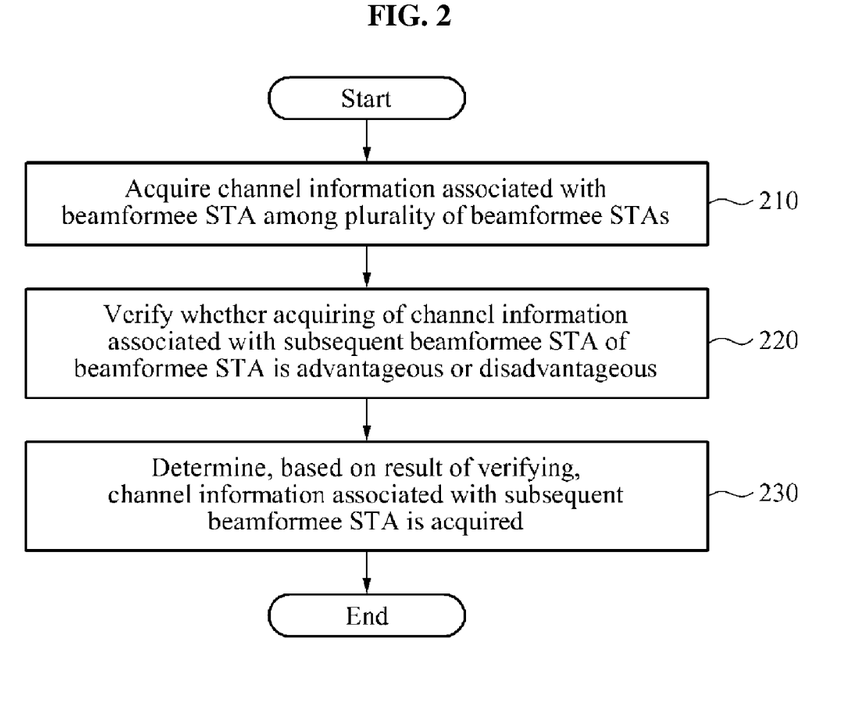
FIG. 2 is a flowchart illustrating a method of selecting a beamformee station (STA) in a multi-user multiple-input and multiple-output (MU-MIMO) communication system according to an example embodiment.

FIG. 2 is a flowchart illustrating a method of selecting a beamformee STA in MU-MIMO communication system according to an example embodiment.

Referring to FIG. 2, in the method of selecting a beamformee STA in MU-MIMO communication system according to an example embodiment, channel information associated with a beamformee STA among a plurality of beamformee STAs may be acquired in operation 210. Hereinafter, the method of selecting a beamformee STA in MU-MIMO communication system may be also referred to as a beamformee STA selecting method. For example, a beamformer STA may transmit an NDPA frame indicating initiation of the sound protocol, and transmit an NDP frame to an SIFS interval. A first beamformee STA initially transmitting the channel information may respond using a VHT_CB frame including the channel information. When other beamformee STAs, aside from the first beamformee STA receive corresponding BR_poll frames, each of the other beamformee STAs may transmit the VHT_CB frame in response to the receiving. Accordingly, in operation 210, channel information associated with one of the first beamformee STA and the other beamformee STAs may be acquired. Also, in operation 210, channel information associated with a subsequent beamformee STA of a beamformee STA transmitting the channel information is described with reference to operation 230, below.

In operation 220, whether acquiring of channel information associated with a subsequent beamformee STA of the beamformee STA among a plurality of beamformee STAs is advantageous or disadvantageous may be verified. In an MU-MIMO operation, beamforming may be performed to maximize transmission efficiency. Thus, to determine the beamformee STA to be incorporated in the sounding protocol, analyzing an advantage and a disadvantage obtained by performing the acquiring of the channel information associated with the subsequent beamformee STA may be performed in operation 220. For example, in an Institute of Electrical and Electronics Engineers (IEEE) 802.11 ac system, a transmission rate may be determined based on a modulation and coding scheme (MCS). Thus, changing to an MCS level providing an increased transmission rate may be required to obtain the advantage in the transmission efficiency by performing the acquiring of channel information associated with the subsequent beamformee STA. As an example, in operation 220, the advantage and the disadvantage obtained from the acquiring of the channel information may be analyzed using various schemes based on whether data to be transmitted during a remaining transmission opportunity (TXOP) time, measured after the beamforming is performed, is sufficient.

When the data to be transmitted during the remaining TXOP time measured after the beamforming is performed is sufficient, and when the MCS is increased from $MCS_A$ to $MCS_B$ by acquiring the channel information associated with the subsequent beamformee STA, an advantage obtained from the acquiring of the channel information may be indicated as shown in Equation 1.

Throughput gain:$T_r*(D(MCS_B)-D(MCS_A))$ [Equation 1]

In Equation 1, $D(x)D(MCS_x)$ denotes a transmission rate of the MCS, for example, x, and $T_r$ denotes the remaining TXOP time for transmission.

A disadvantage obtained from acquiring the channel information may be indicated as shown in Equation 2.

Throughput loss:$T_s*D(MCS_A)$ [Equation 2]

In Equation 2, $T_s$ denotes a time during which the acquiring of the channel information associated with the subsequent beamformee STA is performed.

In operation 220, since the channel information is acquired from the subsequent beamformee STA when the advantage is greater than the disadvantage, a first decision rule may be obtained as shown in Equation 3.

Decision Rule:$T_r*(D(MCS_B)-D(MCS_A))>T_s*D(MCS_A) \Leftrightarrow D(MCS_B)>D(MCS_A)*(1+T_s/T_r)$ [Equation 3]

In Equation 3, an increased $MCS_B$ may be greater than a predetermined value for obtaining the advantage from the acquiring of channel information. In this case, information required for calculating the predetermined value may include a transmission rate measured before the acquiring of the channel information associated with the subsequent beamformee STA is performed, a currently remaining TXOP time, and a time required for the acquiring of channel information. Since acquisition of the required information is possible, a minimum transmission rate for obtaining the advantage from the acquiring of channel information may be calculated. Hereinafter, the minimum transmission rate for obtaining the advantage may be also referred to as an advantageous minimum transmission rate. For example, an 802.11 ac system may include up to nine MCS levels. Thus, when an MCS level satisfying the first decision rule is absent, the acquiring of the channel information associated with the subsequent beamformee STA may not be performed.

As an example, $T_s$ may be a time for transmitting the two SIFS intervals, the BR_poll frame, and the VHT_CB frame. A media access control (MAC) protocol data unit (MPDU) size of the BR_poll frame may be fixed to be 21 bytes. Although a size of the VHT_CB frame is variable, the size of the VHT_CB frame may be assumed to be 2 kilobytes (kB) in this example. A time used for preamble transmission of the VHT_CB frame may be approximately 40 microseconds (μs), and an SIFS interval may be 16 μs. When the transmission rate of the process of the acquiring channel information is approximately 200 megabits per second (Mbps), a total time used for the acquiring of channel information may be approximately 250 μs. When a TXOP limit is AC_VI, $T_r$ may be 3 milliseconds (ms), and when the TXOP limit is AC_VO, $T_r$ may be 1.5 ms. Here, AC may indicate an access category, VI may indicate a video, and VO may indicate a voice. Thus, when $T_r$ is 1 ms, the first decision rule may be $D(MCS_A)>D(MCS_A)*1.25$. Differences among transmission rates of VHT MCS levels may be indicated as shown in Table 1.

TABLE 1

| MCS Index | Modulation | R | Data rate[Multiple] |
|---|---|---|---|
| 0 | BPSK | ½ | 1 |
| 1 | QPSK | ½ | 2 |
| 2 | QPSK | ¾ | 3 |
| 3 | 16-QAM | ½ | 4 |
| 4 | 16-QAM | ¾ | 6 |
| 5 | 64-QAM | ⅔ | 8 |
| 6 | 64-QAM | ¾ | 9 |
| 7 | 64-QAM | ⅚ | 10 |
| 8 | 256-QAM | ¾ | 12 |
| 9 | 256-QAM | ⅚ | 13.333 |

Accordingly, whether the channel information is acquired may be determined by verifying that an MCS providing a transmission rate 1.25 times greater than a current $MCS_A$ is present and realized.

When the data to be transmitted during the remaining TXOP time measured after the beamforming is performed is insufficient, transmission may be rapidly performed and the TXOP may be terminated, thereby using time resources for transmission and reception of other STAs. Thus, in operation 220, the advantage and disadvantage is obtained from the acquiring of the channel information associated with the subsequent beamformee STA in terms of the time resources. For example, when the MCS is increased from $MCS_A$ to $MCS_B$ by performing the acquiring of the channel information associated with the subsequent beamformee STA, and K indicates an amount of data to be transmitted, a time used for transmission in a case of acquiring channel information may be indicated as shown in Equation 4.

$$\text{Time with additional } STA : \frac{K}{D(MCS_B)} + T_S \quad \text{[Equation 4]}$$

When the channel information is not acquired, the time used for transmission may be indicated as shown in Equation 5.

$$\text{Time without additional } STA : \frac{K}{D(MCS_A)} \quad \text{[Equation 5]}$$

Since the time used for transmission in a case of acquiring channel information needs to be less than the time for transmission in a case of not acquiring channel information, a second decision rule may be obtained as shown in Equation 6.

$$\text{Decision Rule} : \frac{K}{D(MCS_B)} + T_S < \frac{K}{D(MCS_A)} \quad \text{[Equation 6]}$$
$$\Leftrightarrow D(MCS_B) > \frac{K * D(MCS_A)}{K - D(MCS_A) * T_s}$$

In Equation 6, since acquisition of values corresponding to a right side of the second decision rule is possible, the advantageous minimum transmission rate may be calculated. When an MCS level satisfying the second decision rule is absent, the acquiring of the channel information associated with the subsequent beamformee STA may not be performed.

When the data to be transmitted during the remaining TXOP time measured after the to beamforming is performed is sufficient, whether the acquiring of the channel information associated with the subsequent beamformee STA is advantageous or disadvantageous may be verified based on whether the MCS level satisfying the first decision rule is present. For example, when the MCS level satisfying the first decision rule is absent, the acquiring of the channel information associated with the subsequent beamformee STA may be verified to be disadvantageous in operation 220. When the MCS level satisfying the first decision rule is present, the acquiring of the channel information associated with the subsequent beamformee STA may be verified to be advantageous in operation 220.

When the data to be transmitted during the remaining TXOP time measured after the beamforming is performed is insufficient, whether the acquiring of the channel information associated with the subsequent beamformee STA is advantageous or disadvantageous may be verified based on whether the MCS level satisfying the second decision rule is present. For example, when the MCS level satisfying the second decision rule is absent, the acquiring of the channel information associated with the subsequent beamformee STA may be verified to be disadvantageous in operation 220. When the MCS level satisfying the second decision rule is present, the acquiring of the channel information associated with the subsequent beamformee STA may be verified to be advantageous in operation 220.

In operation 230, whether the channel information associated with the subsequent beamformee STA is acquired may be determined based on a result of the verifying. When the acquiring of the channel information associated with the subsequent beamformee STA is verified to be advantageous, the channel information associated with the subsequent beamformee STA may be acquired in operation 230. In an example embodiment, when the acquiring of the channel information associated with the subsequent beamformee STA is verified to be advantageous, operation 210 may be performed on the subsequent beamformee STA in the beamformee STA selecting method. Accordingly, in the beamformee STA selecting method, the channel information associated with the subsequent beamformee STA may be acquired, the advantage and the disadvantage of the acquiring of channel information associated with a further subsequent beamformee STA of the subsequent beamformee STA may be analyzed, and whether channel information associated with the further subsequent beamformee STA is acquired based on a result of the analyzing.

In operation 230, when the acquiring channel information associated with the subsequent beamformee STA is verified to be disadvantageous, the acquiring of the channel information associated with the subsequent beamformee STA may not be performed. In an example, when the acquiring of the channel information associated with the subsequent beamformee STA is verified to be disadvantageous, sounding end frames may be transmitted to the subsequent beamforming STA or other beamformee STAs of which channel information is not transmitted. Here, when the acquiring of the channel information associated with the subsequent beamformee STA is verified to be disadvantageous, the acquiring of the channel information associated with the subsequent beamformee STA may not be performed in operation 230. In this case, the subsequent beamformee STA not performing the acquiring of channel information may wait for reception of the BR_poll frame. In this instance, since the time resources of the subsequent beamformee STA may be wasted, the sounding end frame may be transmitted to the subsequent beamformee STA in operation 230. Accordingly, the subsequent beamforming STA or the other beamformee STAs receiving the sounding end frame may suspend an operation based on the sounding protocol.

Figure 3:
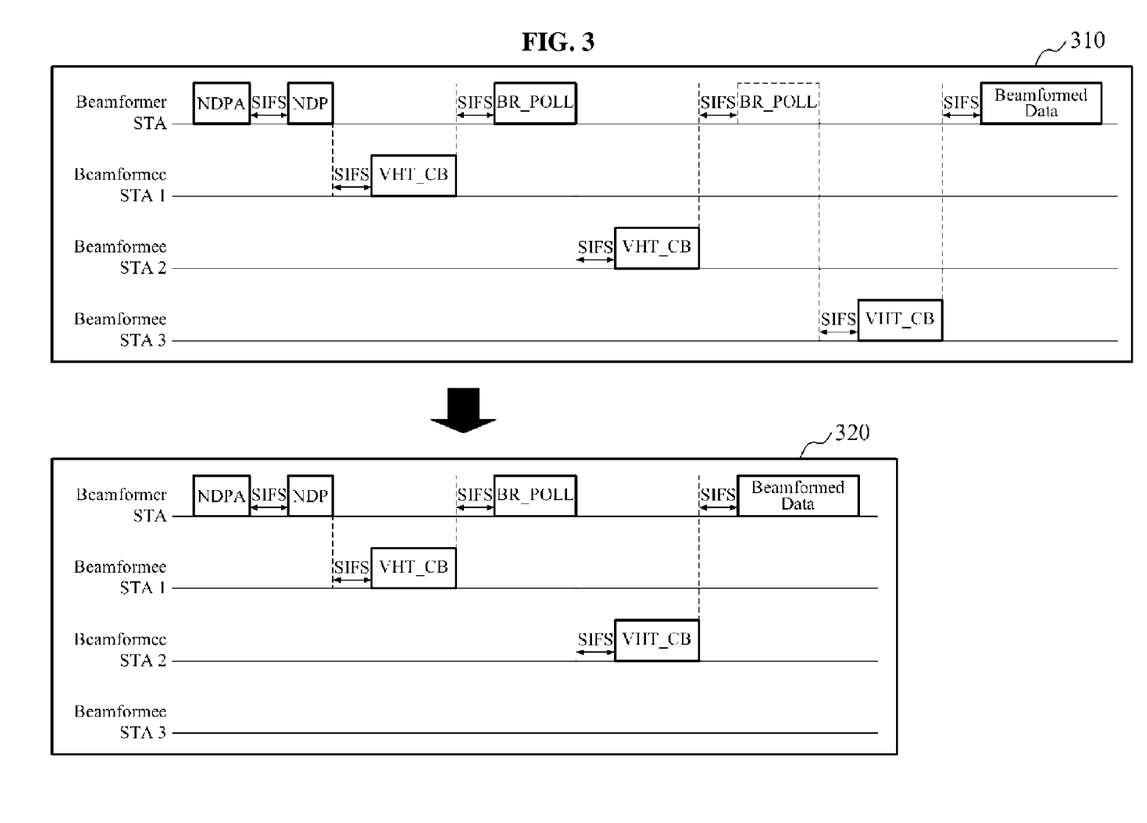
FIG. 3 is a diagram illustrating an example of a method of selecting a beamformee STA in an MU-MIMO communication system according to an example embodiment.

FIG. 3 is a diagram illustrating an example of a beamformee STA selecting method in an MU-MIMO communication system according to an example embodiment.

Referring to FIG. 3, a reference numeral 310 indicates a state of a conventional to sounding protocol in which an acquiring of channel information is performed on three beamformee STAs and beamforming data is transmitted. In this case, since channel information associated with each of the three beamformee STAs is acquired, three STA information fields may be included in an NDPA frame, and the acquiring of channel information may be performed on each of the three beamformee STAs in the conventional sounding protocol.

In case of using the aforementioned first decision rule or second decision rule as indicated by a reference numeral 320, when it is determined that a sufficient efficiency may be achieved by acquiring channel information associated with two beamformee STAs despite presences of the three STA information fields, data transmission may be performed directly without acquiring channel information associated with the other beamformee STA. Accordingly, in the beamformee STA selecting method, time resources may not be wasted and transmission efficiency may be maximized.

Figure 4A:
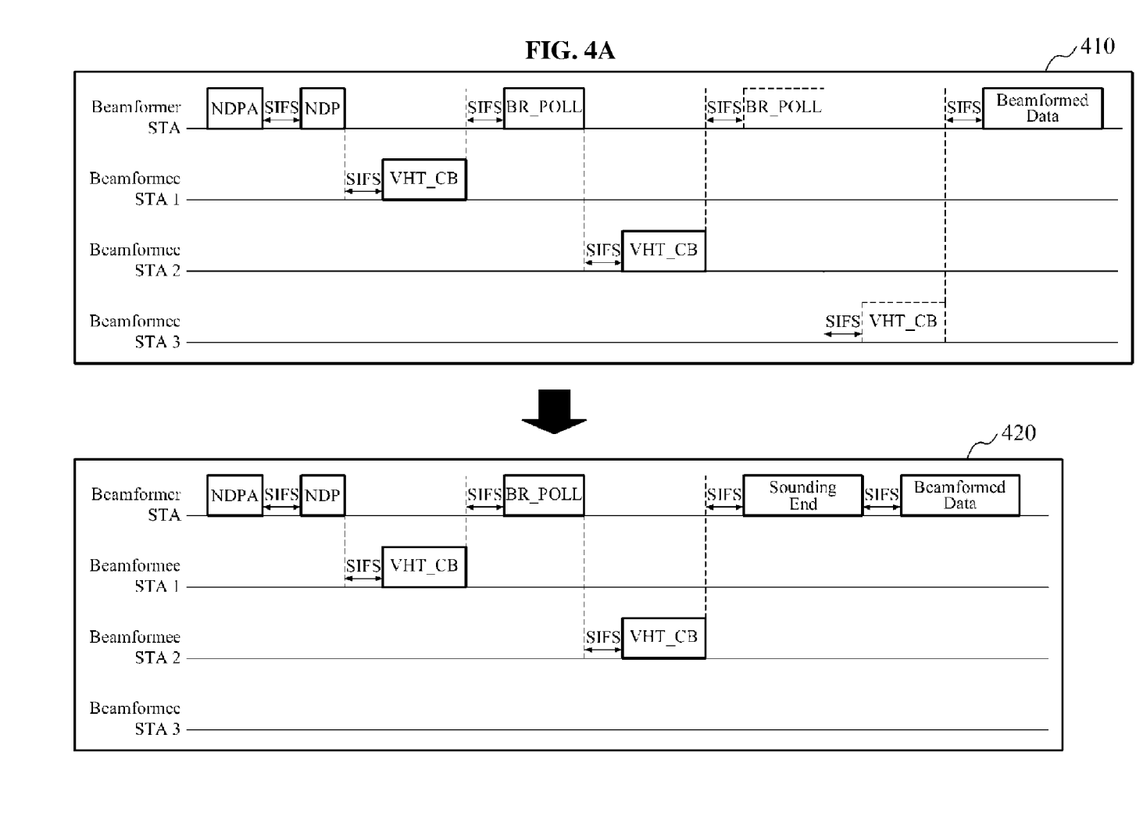
FIGS. 4A and 4B are diagrams illustrating an example of a method of selecting a beamformee STA in an MU-MIMO communication system according to another example embodiment.
Figure 4B:
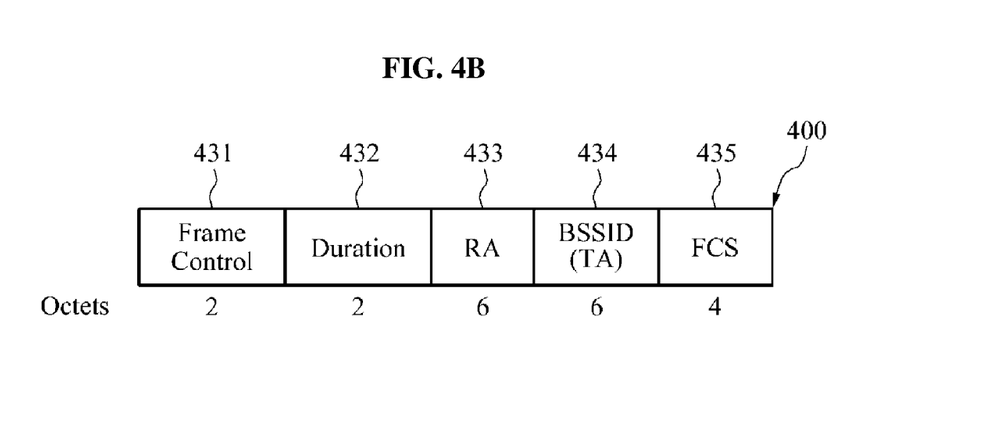

FIGS. 4A and 4B are diagrams illustrating an example of a beamformee STA selecting method in an MU-MIMO communication system according to another example embodiment.

Referring to FIG. 4A, as described in the image 310 of FIG. 3, a reference numeral 410 indicates a state of a conventional sounding protocol in which acquiring of channel information is performed on three beamformee STAs and beamforming data is transmitted. However, a beamformee STA on which the acquiring of channel information is not performed may be present although the beamformee STA is included in an STA information field of an NDPA frame as indicated by the reference numeral 320 of FIG. 3. In this case, since the corresponding beamformee STA may await transmission of a BR_poll frame based on an implemented method, a sounding end frame may be transmitted to indicate termination of the sounding protocol and transmit beamforming data, as indicated by a reference numeral 420. In this instance, time resources may be required for transmitting the sounding end frame and thus, the aforementioned first decision rule and second decision rule may additionally consider such requirements.

Referring to FIG. 4B, a sounding end frame 430 may include a frame control field 431, a duration field 432, a receiver address (RA) field 433, a basic service set identifier (BSSID)(or transmitter address (TA)) field 434, and a frame check sequence (FCS) field 435. In this case, the frame control field 431 may be two octets, the duration field 432 may be two octets, and the RA field 433 may be six octets. The BSSID (or TA) field 434 may be six octets, and the FCS field 435 may be four octets.

Figure 5:
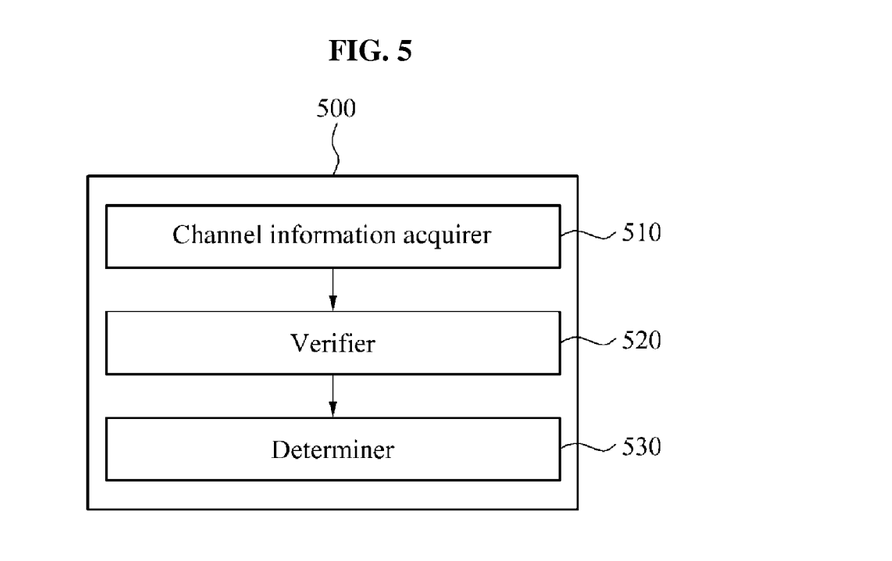
FIG. 5 is a block diagram illustrating an apparatus for selecting a beamformee STA in an MU-MIMO communication system according to an example embodiment.

FIG. 5 is a block diagram illustrating a beamformee STA selecting apparatus 500 in an MU-MIMO communication system according to an example embodiment.

Referring to FIG. 5, the beamformee STA selecting apparatus 500 may include a channel information acquirer 510, a verifier 520, and a determiner 530. In an example embodiment, the beamformee STA selecting apparatus 500 may be included in a beamformer STA.

The channel information acquirer 510 may acquire channel information associated with a beamformee STA among a plurality of beamformee STAs.

The verifier 520 may verify whether acquiring of channel information associated with a subsequent beamformee STA of the beamformee STA is advantageous or disadvantageous.

The determiner 530 may determine, based on a result of the verifying, whether the channel information associated with the subsequent beamformee STA is acquired.

Descriptions provided with FIGS. 1 through 4B may be identically applied to the beamformee STA selecting apparatus 500 in the MU-MIMO communication system according to an example embodiment and thus, repeated descriptions may be omitted for increased ease and convenience.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of selecting a beamformee station (STA) in a multi-user multiple-input and multiple-output (MU-MIMO) communication system, the method comprising:
   acquiring channel information associated with a beamformee STA among a plurality of beamformee STAs;
   verifying whether acquiring channel information associated with a subsequent beamformee STA of the beamformee STA is advantageous or disadvantageous; and
   determining, based on a result of the verifying, whether the channel information associated with the subsequent beamformee STA is acquired,
   wherein the verifying comprises:
      verifying a first transmission rate of a first modulation and coding scheme (MCS) level corresponding to the beamformee STA;
      verifying a second transmission rate of a second MCS level corresponding to the subsequent beamformee STA; and
      verifying whether acquiring channel information associated with the subsequent beamformee STA is advantageous or disadvantageous based on the first transmission rate and the second transmission rate.

2. The method of claim 1, wherein the acquiring comprises:
   transmitting, to the plurality of beamformee STAs, a null-data packet announcement (NDPA) frame and a null-data packet (NDP) frame; and
   receiving a very high throughput compressed beamforming (VHT_CB) frame from the beamformee STA among the plurality of beamformee STAs,
   wherein the VHT_CB frame comprises the channel information associated with the beamformee STA.

3. The method of claim 1, wherein the verifying comprises verifying whether the acquiring of channel information associated with the subsequent beamformee STA of the beamformee STA is advantageous or disadvantageous, based on whether data to be transmitted during a remaining transmission opportunity (TXOP) time, measured after a beamformer STA performs beamforming, is sufficient.

4. The method of claim 3, wherein, when the data to be transmitted during the remaining TXOP time measured after the beamformer STA performs the beamforming is sufficient, the verifying comprises:
   extracting an advantageous minimum transmission rate based on a transmission rate measured before the channel information associated with the subsequent beamformee STA is acquired, the remaining TXOP time, and an amount of time required for acquiring the channel information associated with the subsequent beamformee STA; and
   verifying whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

5. The method of claim 3, wherein, when the data to be transmitted during the remaining TXOP time measured after the beamformer STA performs the beamforming is insufficient, the verifying comprises:
extracting the advantageous minimum transmission rate based on an amount of the data to be transmitted during the remaining TXOP time, the transmission rate measured before the channel information associated with the subsequent beamformee STA is acquired, and the amount of time required for acquiring the channel information associated with the subsequent beamformee STA; and
verifying whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

6. The method of claim 1, wherein the determining comprises acquiring the channel information associated with the subsequent beamformee STA when the acquiring is verified to be advantageous, and not acquiring the channel information associated with the subsequent beamformee STA when the acquiring is verified to be disadvantageous.

7. The method of claim 1, wherein, when the channel information associated with the subsequent beamformee STA is not acquired, the determining comprises transmitting a sounding end frame to the subsequent beamformee STA.

8. The method of claim 1, wherein, when the channel information associated with the subsequent beamformee STA is acquired, the acquiring, the verifying, and the determining are performed on the subsequent beamformee STA.

9. An apparatus for selecting a beamformee station (STA) in a multi-user multiple-input and multiple-output (MU-MIMO) communication system, the apparatus comprising:
a channel information acquirer to acquire channel information associated with a beamformee STA among a plurality of beamformee STAs;
a verifier to verify whether acquiring channel information associated with a subsequent beamformee STA of the beamformee STA is advantageous or disadvantageous; and
a determiner to determine, based on a result of the verifying, whether the channel information associated with the subsequent beamformee STA is acquired,
wherein the verifier verifies a first transmission rate of a first modulation and coding scheme (MCS) level corresponding to the beamformee STA, verifies a second transmission rate of a second MCS level corresponding to the subsequent beamformee STA is advantageous or disadvantageous based on the first transmission rate and the second transmission rate.

10. The apparatus of claim 9, wherein the channel information acquirer comprises:
a frame transmitter to transmit a null-data packet announcement (NDPA) frame and a null-data packet (NDP) frame to the plurality of beamformee STAs; and
a frame receiver to receive a very high throughput compressed beamforming (VHT_CB) frame from the beamformee STA among the plurality of beamformee STAs, wherein the VHT_CB frame comprises the channel information associated with the beamformee STA.

11. The apparatus of claim 9, wherein the verifier verifies whether the acquiring of channel information associated with the subsequent beamformee STA of the beamformee STA is advantageous or disadvantageous, based on whether data to be transmitted during a remaining transmission opportunity (TXOP) time measured after a beamformer STA performs beamforming is sufficient.

12. The apparatus of claim 11, wherein, when the data to be transmitted during the remaining TXOP time measured after the beamformer STA performs the beamforming is sufficient, the verifier extracts an advantageous minimum transmission rate based on a transmission rate measured before the channel information associated with the subsequent beamformee STA is acquired, the remaining TXOP time, and a required time for acquiring the channel information associated with the subsequent beamformee STA, and
verifies whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

13. The apparatus of claim 11, wherein, when the data to be transmitted during the remaining TXOP time measured after the beamformer STA performs the beamforming is insufficient, the verifier extracts the advantageous minimum transmission rate based on an amount of the data to be transmitted during the remaining TXOP time, the transmission rate measured before the channel information associated with the subsequent beamformee STA is acquired, and the required time for acquiring the channel information associated with the subsequent beamformee STA, and
verifies whether the acquiring of channel information associated with the subsequent beamformee STA of the beamformee STA is advantageous or disadvantageous, based on a transmission rate measured after the channel information associated with the subsequent beamformee STA is acquired, and the advantageous minimum transmission rate.

14. The apparatus of claim 9, wherein the determiner acquires the channel information associated with the subsequent beamformee STA when the acquiring is verified to be advantageous, and does not acquire the channel information associated with the subsequent beamformee STA when the acquiring is verified to be disadvantageous.

15. The apparatus of claim 9, wherein, when the channel information associated with the subsequent beamformee STA is not acquired, the determiner comprises:
a sounding end frame transmitter to transmit a sounding end frame to the subsequent beamformee STA.

* * * * *